United States Patent [19]
Haas et al.

[11] 3,936,640
[45] Feb. 3, 1976

[54] IMAGING SYSTEM

[75] Inventors: Werner E. L. Haas, Webster; Joseph F. Stephany, Sodus, both of N.Y.

[73] Assignee: Xerox Corporation, Stamford, Conn.

[22] Filed: Sept. 25, 1974

[21] Appl. No.: 509,210

[52] U.S. Cl. ............ 250/372; 250/331; 350/160 LC
[51] Int. Cl.² ..................... G01J 1/42; G02B 5/23
[58] Field of Search ................. 250/331, 372, 474; 350/160 LC

[56] References Cited
UNITED STATES PATENTS

| | | | |
|---|---|---|---|
| 3,829,684 | 8/1974 | Assouline et al. | 250/331 X |
| 3,844,650 | 10/1974 | Nicholson et al. | 350/150 LC X |
| 3,848,250 | 11/1974 | Kashio | 350/160 LC X |
| 3,851,970 | 12/1974 | Adler et al. | 250/372 X |

*Primary Examiner*—Archie R. Borchelt
*Attorney, Agent, or Firm*—James J. Ralabate; Michael H. Shanahan; George J. Cannon

[57] ABSTRACT

Method and apparatus for maintaining the conductance of liquid crystalline compositions comprising pure transstilbene liquid crystalline materials at a level sufficient to allow dynamic scattering of the composition.

11 Claims, 5 Drawing Figures

IMAGING SYSTEM

BACKGROUND OF THE INVENTION

This invention relates to the dynamic scattering of nematic liquid crystalline compositions and particularly to such compositions comprising a pure trans-stilbene. More particularly, this invention relates to the surveilance and maintenance of conductance of nematic liquid crystalline compositions comprising a pure trans-stilbene in order to allow for the repetitive dynamic scattering of the composition.

Most nematic liquid crystalline materials are known to exhibit dynamic scattering. Dynamic scattering is generally observed in most nematic liquid crystalline materials upon application of an electrical field of sufficient strength to cause disruption of the alignment order of the nematic molecules and the resultant creation of relatively large regions of turbulence.

Without being under the influence of an aligning agent or an electrical field, the molecules of nematic liquid crystalline material point in one direction although the orientation differs from area to area.

Upon application of an electrical field across a layer of nematic liquid crystalline material, the molecules of the nematic line up with their long axes at some predetermined relationship to the field direction. When the electrical field is of sufficient strength to cause ions to move towards the electrodes by which the electrical field is applied, the ions disrupt the order of alignment of the nematic molecules and create relatively large regions of turbulence. Dynamic scattering of light results.

Dynamic scattering of pure trans-stilbene nematic liquid crystalline materials can not be achieved due to the large resistivities of the trans-stilbene materials.

It has been known that stilbenes exhibit "photosensitivity" in that in the presence of light these tended to decompose, and in the simultaneous presence of light and oxygen, phenantrene is formed. See, for example, U.S. Pat. No. 3,767,289.

In the liquid crystalline art, however, the high resistivity of nematic stilbenes have typically been modified, as in U.S. Pat. No. 3,767,289, by the addition of dopants. For example, ether complex salts have been used. I. Haller and G. Gladstone, Fourth International Liquid Crystal Conference, Kent, Ohio, Aug. 21–25, 1972.

U.S. Pat. No. 3,655,971 discloses exposure of liquid crystalline materials to ultra-violet radiation for imaging and without the application of voltage.

It has recently been discovered that nematic liquid crystalline compositions comprising a pure trans-stilbene can be made susceptible to dynamic scattering by irradiation with ultraviolet radiation. The electrical resistivity of the composition is thereby decreased and the conductance of the composition correspondingly increased. This technique is disclosed in copending U.S. applications Ser. No. 509,151, filed on Sept. 25, 1974 by Werner E. L. Haas and entitled "IMAGING METHOD."

In new and growing areas of technology such as liquid crystal imaging, new methods, apparatus, compositions, and articles of manufacture are often discovered for the application of the new technology in a new mode. The present invention relates particularly to a novel system for dynamically scattering pure trans-stilbene nematic liquid crystalline materials and more generally to maintaining a predetermined resistivity in mixtures of liquid crystalline materials including a trans-nematic stilbene.

SUMMARY OF THE INVENTION

It is, therefore, an object of this invention to provide for the continued, repetitive dynamic scattering of nematic liquid crystalline compositions comprising a pure trans-stilbene nematic liquid crystalline material.

It is another object of this invention to provide a novel imaging system.

It is a further object of this invention to provide means for monitoring the conductance of the nematic liquid crystalline composition, and to maintain the conductance thereof at or above a predetermined value.

The foregoing objects and others are accomplished in accordance with this invention by providing an electrical circuit in electrical connection with the voltage source of an imaging member comprising the liquid crystalline composition, and in electrical connection with a source of ultraviolet radiation. In its simplest embodiment, the circuit comprises a comparator and a control for the ultraviolet radiation source. In other embodiments, the electrical circuit further comprises signal delay elements and coincidence counters which allow for selective monitoring of the liquid crystalline composition conductance.

BRIEF DESCRIPTION OF THE DRAWINGS

For a better understanding of the invention, as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1:
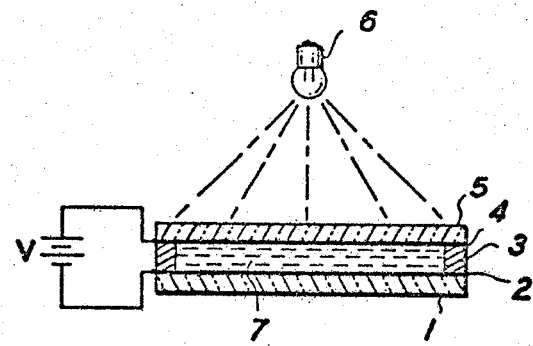
FIG. 1 is a schematic illustration of an imaging member utilized in the imaging system of the present invention.

Referring now to FIG. 1, there is seen an imaging member comprising substrates 1 and 5 provided with conductive coatings 2 and 4 to form electrodes. A layer 7 of nematic liquid crystalline composition comprising a pure trans-stilbene compound is sandwiched between conductive coatings 2 and 4 and retained by spacer 3. Ultraviolet radiation from radiation source 6 impinges layer 7 and reduces the electrical resistivity thereof to a level which renders layer 7 susceptible to dynamic scattering under the influence of a D.C. or A.C. voltage provided by voltage source V.

"Pure" is used herein to mean that the liquid crystalline composition and the trans-stilbene nematic lacks sufficient charge carriers to exhibit dynamic scattering (absent ultraviolet radiation) at the voltage level applied to successfully produce dynamic scattering subsequent to ultraviolet irradiation.

The electrodes comprising substrates 1 and 5 with conductive coatings 2 and 4, respectively can be made of any suitable transparent material. Substrates 1 and 5 can be made of glass or plastic or other materials which are substantially transparent. Conductive coatings 2 and 4 can comprise any typical suitable transparent, conductive coatings such as, for example, tin, indium oxide, aluminum, chromium, tin oxide, or any other suitable conductor. These substantially transparent conductive coatings are typically evaporated onto the more insulating transparent substrates. NESA glass, a tin oxide coated glass manufactured by the Pittsburgh Plate Glass Co., is a commercially available example of a typical transparent conductive electrode comprising a substrate and a conductive coating.

Spacer 3 separates the electrodes and contains the liquid crystalline composition between the electrodes. Spacer 3 is typically chemically inert, transparent, substantially insulating and has appropriate dielectric characteristics. Materials suitable for use as insulating spacers include cellulose acetate, cellulose triacetate, cellulose acetate butyrate, polyurethane elastomers, polyethylene, polypropylene, polyesters, polystyrene, polycarbonates, polyvinylfluoride, polytetrafluoroethylene, polyethylene terephthalate, and mixtures thereof.

Layer 7 of liquid crystalline composition comprising a pure trans-stilbene may comprise only the nematic trans-stilbene or mixtures thereof, or can comprise any pure composition of any typical suitable material added to the trans-stilbene wherein the trans-stilbene is a component of the composition. Examples of the latter composition include, for example, the addition of optically active materials, whether mesomorphic or not, and other nematic liquid crystalline materials to the trans-stilbene nematic liquid crystalline material. These other materials which are mixed with the trans-stilbene nematic should be pure as defined hereinabove.

Typical suitable non-mesomorphic optically active materials to be added to the host trans-stilbene nematic liquid crystalline material include: derivatives of alcohol such as l-menthol, l-linanol, d-mannitol, d-borneol and d-quercitol; derivatives of ketones such as d-camphor, d-3-methylcyclohexanone, l-methone and l-6-isopropyl-3 cyclohexanone; derivatives of carboxylic acids such as d-citronellic acid, l-citronellic acid, d-chaulmoogric acid, l-campholic acid, l-arabonic acid, d-tartaric acid, and l-ascorbic acid; derivatives of aldehyde such as d-citronellal; derivatives of alkenes such as l-B-pinane, d-silvesterene, and derivatives of nitriles such as d-mandelonitrile; derivatives of amides such as d-hydrocarbamide; and mixtures thereof.

Typical suitable mesomorphic optically active materials include liquid crystalline optically active materials such as cholesteric liquid crystalline materials. Typical suitable cholesteric liquid crystalline materials include derivatives from reactions of cholesterol and inorganic acids; for example, cholesteryl chloride, cholesteryl bromide, cholesteryl iodide, cholesteryl nitrate; esters derived from reactions of cholesterol and carboxylic acids; for example, cholesteryl crotonate; cholesteryl nonanoate; cholesteryl hexanoate; cholesteryl formate; cholesteryl chloroformate; cholesteryl propionate; cholesteryl acetate; cholesteryl valerate; cholesteryl linolate; cholesteryl linolenate; cholesteryl oleate; cholesteryl erucate; cholesteryl butyrate; cholesteryl caprate; cholesteryl laurate; cholesteryl myristate; ethers of cholesterol such as cholesteryl decyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl heptyl carbamate; and alkyl amides and aliphatic secondary amines derived from $3\beta$-amino-$\Delta^5$-cholestene and mixtures thereof; peptides such as poly-$\gamma$-benzyl-$l$-glutamate; derivatives of beta sitosterol such as sitosterol chloride; and active amyl ester of cyano benzylidene amino cinnamate. The alkyl groups in said compounds are typically saturated or unsaturated fatty acids, or alcohols, having less than about 25 carbon atoms and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Layer 7 of liquid crystalline compositions comprising any of the aforementioned combination of materials can be prepared in organic solvents such as chloroform, petroleum ether, methylethyl ketone and others, which are typically subsequently evaporated from the mixture thereby leaving the liquid crystalline composition.

Typical suitable trans-stilbene nematic liquid crystalline materials include: 4-methoxy-4'-n-octyloxy-$\beta$-methyl-trans-stilbene, 4-n-butoxy-4'-$\alpha$-methyl-trans-stilbene; 4-methoxy-4'-n-octyloxy-$\beta$-chloro-trans-stilbene; 4-ethoxy-4'-n-butyl-$\beta$-methyl-trans-stilbene; 4-ethoxy-4'-n-butyl-$\alpha$-methyl-trans-stilbene; 4-ethoxy-4'-n-pentyl-$\beta$-chloro-trans-stilbene; 4-ethoxy-4'-n-butyl-$\alpha$-chloro-trans-stilbene; 4-ethoxy-2-methyl-4'-n-butyl-trans-stilbene; 4-acetoxy-4'-n-butyl-$\beta$-chloro-trans-stilbene; 4-methoxy-4'-n-octyl-$\beta$-chloro-trans-stilbene; 4-n-heptyloxy-4'-n-propyl-$\beta$-chloro-trans-stilbene; 4-methoxy-4'-n-butyl-$\beta$-chloro-trans-stilbene; 4-ethoxy4'(3-methylbutyl)-$\beta$-chloro-trans-stilbene; 4-ethoxy-4'-n-butyl-$\beta$-chloro-trans-stilbene; 4-n-propoxy-4'-n-butyl-$\beta$-chloro-trans-stilbene; 4-ethoxy-4'-n-hexyl-$\beta$-chloro-trans-stilbene; 4-n-hexyloxy-4'-n-butyl-$\beta$-chloro-trans-stilbene; 4-ethoxy-4'-n-octyl-$\beta$-chloro-trans-stilbene; 4-ethoxy-4(2-methylpentyl)-$\beta$-chloro-trans-stilbene; 4-n-butoxy-4'-n-butyl-$\beta$-chloro-trans-stilbene; 4-ethoxy-4'(2-methylhexyl)-$\beta$-chloro-trans-stilbene; 4-ethoxy-4'(2-methylbutyl)-$\beta$-chloro-trans-stilbene; 4-butyl-4'-n-octyl-$\beta$-chloro-trans-stilbene; 4-cyano-4'-n-butyl-$\beta$-chloro-trans-stilbene; trans-4-butyl-$\alpha$-chloro-4'-ethoxystilbene; trans4-octyl-$\alpha$-chloro-4'-ethoxystilbene; 4,4'-dimethoxystilbene.

Layer 7 of liquid crystalline composition comprising a trans-stilbene nematic liquid crystalline material preferably has a thickness in the range of about 1 to about 100 microns.

Radiation source 6 of ultraviolet radiation may comprise any suitable source of ultraviolet radiation. Typical suitable sources of ultraviolet radiation are commercially available such as, for example, D.C. xenon mercury lamps, available from Oriel Optics Corporation, 1 Market Street, Stamford, Connecticut; and mercury lamps such as model BH-6 high pressure, short arc mercury lamps available from General Electric Company, Lamp Business Division, Cleveland, Ohio.

Voltage source V can comprise any suitable source of D.C. or A.C. voltage. Trans-stilbene nematic liquid crystalline materials irradiated with ultraviolet radiation typically have a threshold level of voltage at or above which dynamic scattering is exhibited. The upper limit of voltage magnitude is typically governed by electrical breakdown of the imaging system. The threshold voltage at which trans-stilbene nematic liquid crystalline materials irradiated with ultraviolet typically begin to exhibit dynamic scattering is within the range of from about 10 to about 50 volts. When employed to produce dynamic scattering, A.C. voltages are preferably of a frequency up to about 100 Hz. Frequencies above about 100 Hz tend to diminish movement of ions within the layer of liquid crystalline composition thereby diminishing the dynamic scattering effect.

In embodiments of the present invention where the dynamic scattering is provided with memory such as, for example, when the trans-stilbene nematic liquid crystalline material is mixed with a cholesteric liquid crystalline material, then A.C. voltages of magnitude greater than the imaging or dynamic scattering magnitude is employed at frequencies greater than 100 Hz in order to erase the stored dynamic scattering.

In imaging embodiments of the present invention the layer 7 of liquid crystalline composition comprising a trans-stilbene nematic material is dynamically scattered in imagewise configuration. Generally speaking, this can be made to occur by any of the numerous imagewise address methods known in the art. For example, radiation source 6 of ultraviolet radiation may be passed through a stencil or mask and caused to impinge layer 7 in imagewise configuration, thereby decreasing the resistance of layer 7 in imagewise configuration sufficient to result in dynamic scattering in imagewise configuration. Other methods can be utilized where radiation source 6 uniformly impinges layer 7. These methods include, for example, utilizing a shaped electrode as at least one of the two electrodes employed, although, of course, both electrodes may be shaped in imagewise configuration. Another method employing uniform irradiation from source 6 includes the addition of a photoconductive layer between one of the electrodes and the layer 7 of trans-stilbene nematic liquid crystalline material.

Figure 2:
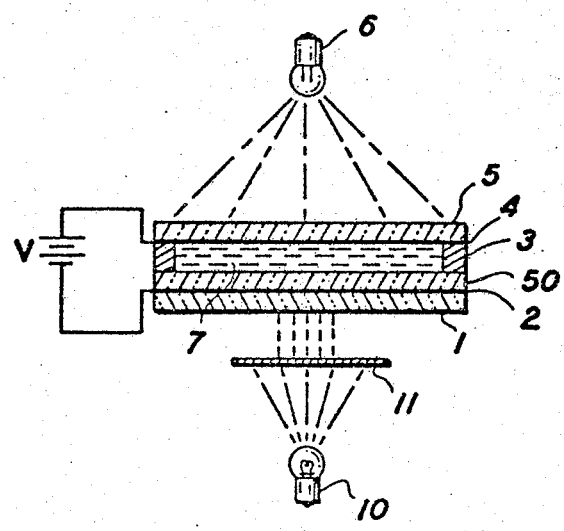
FIG. 2 is a schematic illustration of another imaging member utilized in the imaging system of the present invention.

This can be seen in FIG. 2, wherein like numerals refer to like elements found in FIG. 1. In FIG. 2, layer 50 of photoconductive material is shown positioned between conductive coating 2 and layer 7 of trans-stilbene nematic liquid crystalline composition. Radiation source 10 is a source of radiation which is actinic to the photoconductive material in layer 50. Stencil or mask 11 is positioned intermediate radiation source 10 and layer 50 of photoconductive material and allows only imagewise configured actinic radiation to impinge layer 50.

In the embodiment of FIG. 2, layer 50 of photoconductive material may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rhodamine Dye, available from Dupont, selenium, selenium alloyed with arsenic such as, for example, arsenic triselenide, selenium alloyed with tellurium, antimony, or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which are hereby incorporated by reference. Typical suitable organic photoconductive materials include, for example, a combination of 2-5-bis(p-aminophenyl)-1,3,4-oxadiazole available under the trademark TO 1920 from Kalle and Company, Weisbaden-Biebrich, Germany and Vinylite VYNS, a copolymer of vinylchloride and vinyl acetate available from Carbide and Carbon Chemicals Co.; and the combination of 2,4,7-trinitro-9-fluorenone to polyvinyl carbazole, available under the trademark Luvican 170 from Winter, Wolf and Co., New York, New York. The thickness of the photoconductive layer is not critical to the practice of the present invention and any thickness which provides a sufficiently high dark resistance may be utilized.

That is, the dark resistance should be sufficient to provide greater voltage across the photoconductive layer than across the liquid crystalline layer in the dark. When struck by actinic radiation, the voltage decreases across the photoconductive layer and increases across the liquid crystalline layer.

It will be appreciated that photoconductors having a fundamental absorption band within the electromagnetic spectrum, including the visible region, the x-ray region, the infrared region, etc. can be employed. Preferably the photoconductive materials employed in the present invention do not have a fundamental absorption band within the ultraviolet region so that the irradiation of layer 7 of liquid crystalline composition by the radiation source 6 is not actinic to the layer 50 of photoconductive material. The radiation source 10 utilized will, of course, provide radiation which is actinic to the photoconductor employed.

In summary, the embodiment depicted in FIG. 2 provides a system wherein the electrical resistivity of layer 7 of liquid crystalline composition is uniformly decreased by ultraviolet radiation and wherein a voltage is applied in imagewise configuration utilizing an optical input from radiation source 10 to render layer 50 of photoconductive material conductive in imagewise configuration.

Other means of applying a voltage across layer 7 in imagewise configuration which will allow the uniform impingement of layer 7 of liquid crystalline composition with ultraviolet radiation are well known to those skilled in the art. These include x–y address systems, bit matrices and numerous other electro-optic cell configurations.

In accordance with the practice of the present invention, the important effect sought is the maintenance of electrical resistivity of layer 7 of trans-stilbene nematic liquid crystalline composition at a level which will allow dynamic scattering of layer 7 under applied voltage. Accordingly, the degree to which the electrical resistivity is reduced depends on the identity of the trans-stilbene and the voltage magnitude employed. Typical suitable electrical resistivities for trans-stilbenes at which dynamic scattering occurs are within the range from about $2 \times 10^{11}$ to $4 \times 10^8$ ohms-cm.

The following examples further specifically illustrate various preferred embodiments of the present invention. Parts and percentages are by weight unless otherwise indicated.

EXAMPLE I

An imaging member according to FIG. 1 is prepared as follows: substrates 1 and 5 comprise quartz slides of the type typically employed in microscopic examination. Conductive coatings 2 and 4 comprise indium oxide; spacer 3 is an about ½ mil thick Mylar spacer, a polyethylene terephthalate available from Dupont; and layer 7 of liquid crystalline composition comprises about 65 percent by weight of trans-4-butyl-α-chloro4'-ethoxystilbene and about 35 percent by weight cholesteryl oleyl carbonate. A 200 watt Hanovia 901 B 1 xenon mercury lamp available from Oriel Optics Corporation is positioned about 5 inches from the liquid crystalline composition. The xenon mercury lamp is activated and radiation therefrom strikes the layer of liquid crystalline composition until the electrical resistivity of the composition is about $2 \times 10^{11}$ ohms/cm. A D.C. voltage source is electrically connected to the indium oxide coating and provides a D.C. voltage of about 50 volts. Layer 7 of liquid crystalline composition substantially uniformly exhibits dynamic scattering.

EXAMPLE II

Example I is followed except that the xenon mercury lamp is not activated. Upon application of about 50 volts, D.C., the layer of liquid crystalline composition does not exhibit dynamic scattering.

EXAMPLE III

Example I is repeated with the exception that the ultraviolet radiation first passes through a stencil prior to impinging the layer of liquid crystalline composition. Upon application of 50 D.C. volts, the layer of liquid crystalline composition dynamically scatters in imagewise configuration.

EXAMPLE IV

The imaging system of FIG. 2 is provided by following the procedures of Example I with the addition of: vacuum evaporation of an about 8 micron thick layer of arsenic triselenide onto the indium oxide coating of one of the substrates; the provisioning of a monochromator tuned to provide radiation at a wavelength of about 4540A and positioned to provide within about 1 sec a total incident flux of about $2.4 \times 10^{12}$ photons/cm$^2$; and, a stencil is positioned between the monochromator and the layer of arsenic triselenide. With the 50 D.C. voltage applied, the layer of liquid crystalline composition is impinged with ultraviolet radiation until the electrical resistivity of the composition reaches about $2 \times 10^{11}$ ohms-cm. The ultraviolet radiation is discontinued and the monochromator activated. Substantially immediately upon activation of the monochromator the layer of liquid crystalline composition dynamically scatters in imagewise configuration corresponding to the stencil image.

EXAMPLE V

The imaging system of FIG. 2 is provided by following the procedures of Example IV except that the liquid crystalline composition comprises about 80 percent by weight of the stilbene of Example I and about 20 percent by weight of the cholesteryl oleyl carbonate of Example I.

The about 67 D.C. volts are applied and the layer of liquid crystalline composition is impinged with ultraviolet radiation until the electrical conductance of the composition reaches about 0.5 micro-amps/cm$^2$.

Thereafter, the member is imaged in accordance with the procedure of Example IV and subsequent to imaging, the member is erased by applying 500 volts A.C. peak-to-peak voltage at 635 cycles/sec for about 3.2 sec. This image and erase procedure, constituting one cycle, is repeated for a total of about 400 cycles. The xenon mercury lamp is again activated until the electrical conductance of the liquid crystalline composition reaches about 0.7 micro-amps/cm$^2$. The imaging member is again imaged and erased for an additional 500 cycles at which time ultraviolet radiation is again utilized to readjust the electrical conductance of the liquid crystalline composition to about 0.7 micro-amps/cm$^2$.

During image cycling, the image quality begins to degrade prior to ultraviolet irradiation and is restored by ultraviolet irradiation of the liquid crystalline composition.

EXAMPLE VI

Example V is followed except that the liquid crystalline composition comprises about 73.4 percent by weight of the stilbene and about 16.6 percent by weight of cholesteryl oleyl carbonate.

About 86 volts D.C. voltage is applied and the liquid crystalline composition subjected to ultraviolet radiation until the electrical conductance of the composition reaches about 0.7 micro-amps/cm$^2$.

Thereafter, the member is imaged during application of about 86 volts D.C. and is erased at about 440 volts peak-to-peak A.C. voltage at about 635 cycles/sec for about 3.2 sec. With image and erasure constituting one cycle, the member is cyclically imaged for about 423 image cycles and again subjected to ultraviolet radiation until the electrical conductance of the liquid crystalline composition reaches about 0.7 micro-amps/cm$^2$.

Prior to completion of the 423 imaging cycles, the image quality begins to degrade. Subsequent to the irradiation of the liquid crystalline composition with ultraviolet radiation, image quality returns and is maintained for about another 400 cycles.

Examples V and VI demonstrate that the initial irradiation with ultraviolet radiation renders the liquid crystalline composition comprising a nematic trans-stilbene susceptible to dynamic scattering but that the quality of images produced in accordance therewith decreases. These two examples further demonstrate that subsequent subjection of the liquid crystalline composition to ultraviolet radiation can be utilized to regain and maintain image quality. Although the mechanism is not completely understood, it is theorized that the initial ultraviolet irradiation generates charge carriers and that, in time, the carriers become depleted. Consistent with this theory, it has been observed that the resistivity of the liquid crystalline composition initially subjected to ultraviolet radiation slowly increases in time and that subsequent exposure to ultraviolet radiation results in a lowering of the resistivity of the liquid crystalline composition containing pure trans-stilbene nematics.

In accordance with the present invention, there is now provided an electro-optic system wherein the liquid crystalline composition is automatically monitored and periodically subjected to ultraviolet radiation in order to maintain its electrical resistivity or conductance at a value which ensures quality image throughout image cycling.

Figure 3:
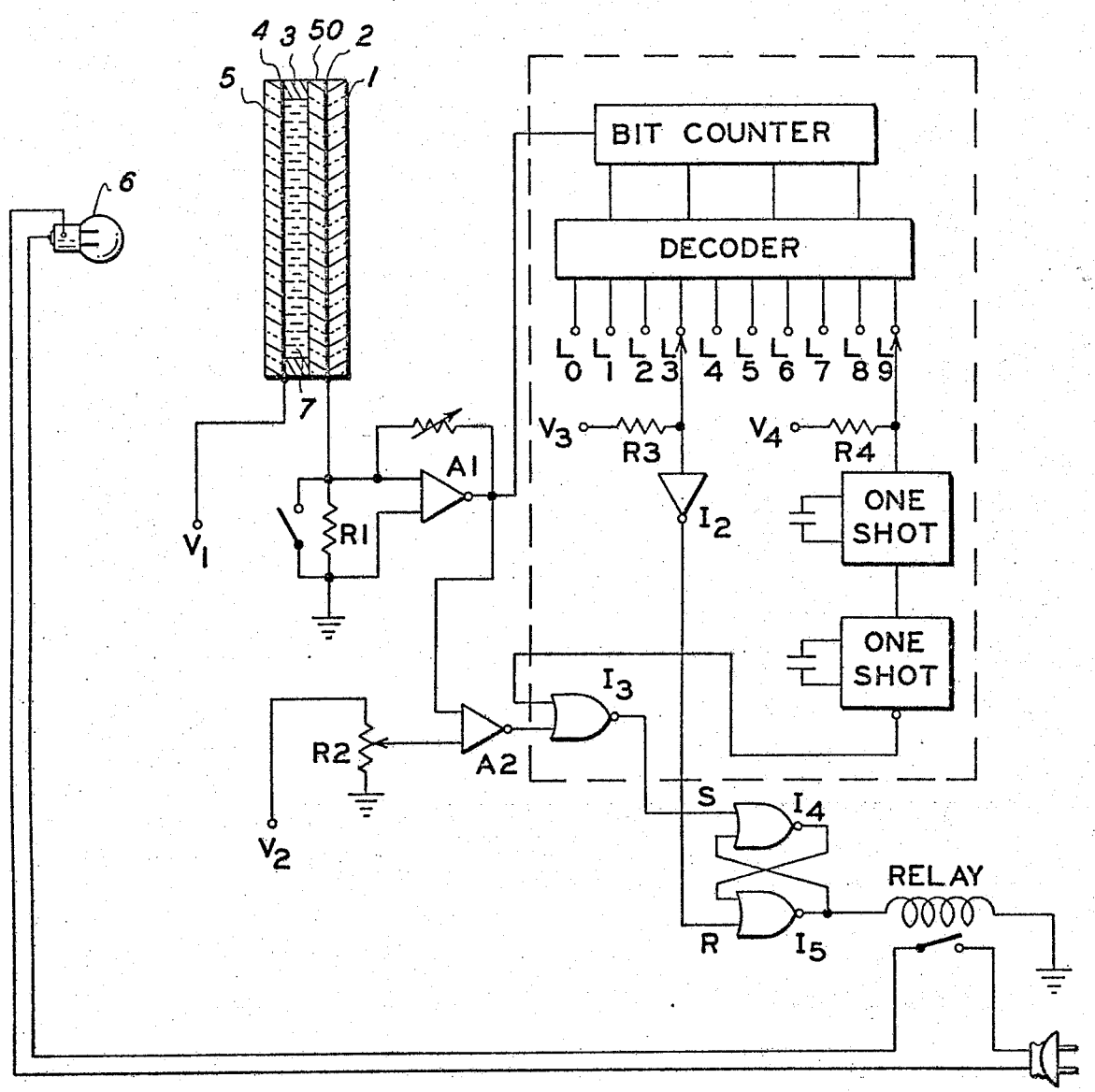
FIG. 3 is a schematic illustration of one imaging system embodiment of the present invention.

Referring now to FIG. 3, the imaging member of FIG. 2 is electrically connected to an operational imaging voltage $V_1$ and associated electrical circuitry. The circuitry triggers lamp 6, a source of ultraviolet radiation, whenever the electrical resistance of layer 7 of liquid crystalline composition comprising a pure nematic trans-stilbene becomes too high.

In the preferred embodiment depicted in FIG. 3 the circuitry comprises a coincidence counting circuit (bracketed by the dotted line), a comparator ($A_2$) and a lamp control ($I_4$, $I_5$ and relay). In operation, the coincidence counting circuit provides for selective monitoring of the resistance of layer 7 and provides for the selective duration of lamp 6 activation.

More particularly, each time operational imaging voltage $V_1$ is activated, the current passing through layer 7 also passes through $R_1$ yielding a voltage $V_o$ proportional to the current in layer 7. $V_o$ is amplified by analog amplifier $A_1$ having an adjustable gain. The voltage output from $A_1$ goes to the counter component of the coincidence counting circuit and to the comparator, analog amplifier $A_2$. A control circuit comprises a voltage source $V_2$ and potentiometer $R_2$ having values selected to yield a voltage to $A_2$ which is representative of the lowest desirable current level in layer 7. That is, the voltage divided by $R_2$ is set at a value representing the magnitude of voltage output from $A_1$ when the current in layer 7 reaches a high resistance state which borders on impairing dynamic scattering of the pure-trans-stilbene nematic component of layer 7.

Comparative analog amplifier $A_2$, compares the $A_1$ voltage output with the control circuit voltage output and generates a voltage output only when the $A_1$ output is greater than the control circuit output. Otherwise, the $A_2$ output is zero. The $A_2$ output is placed on one input of NOR gate $I_3$. The other input for NOR gate $I_3$ comes from the remainder of the coincidence counting curcuit and is either positive or zero. Only when both inputs are zero, the voltage out of $I_3$ rises to a value sufficient to set a flip-flop comprising NOR gates $I_4$ and $I_5$ through lead S. When the output from the remainder of the coincidence counting circuit is positive and constitutes the other input for NOR gate $I_3$, the $I_3$ output is insufficient to set the flip-flop.

The output from the set flip-flop energizes a relay which energizes the ultraviolet radiation source, lamp 6. The flip-flop is reset through lead R by inverter $I_2$ whenever the decoder activates $I_2$.

In operation of the coincidence counting circuit the amplified voltage-output of $A_1$ goes into the bit counter which is activated once for each application of operational imaging voltage $V_1$. Each activation of the bit counter sequentially causes the decoder to advance from one lead $L_n$ to another lead $L_{n+1}$. When the decoder advances to the lead, here $L_9$, with which the one shots are selectively connected, the first one shot is triggered and, in turn, triggers the second one shot. The voltage output of the second one shot is inverted to zero and enters the other input of NOR gate $I_3$. The output from the one shots is positive at all locations of $L_n$ except the preselected one. In this way, $I_3$ will generate an output only when the one shot inverted output is zero and when the $A_2$ output is coincidentally zero. Thus, the coincidence counting circuit gates NOR gate $I_3$ periodically (here every tenth imaging cycle) and allows comparator $A_2$ to cause energization of the flip-flop only at preselected intervals of imaging cycles.

Once the lamp source 6 is energized via the flip-flop energized relay, the lamp remains energized until the decoder advances to the lead, here $L_3$, with which the inverter $I_2$ is selectively connected. When the decoder so advances, $I_2$ is triggered and via lead R resets the flip-flop thereby causing the relay contacts to open and turn off lamp 6.

Typical suitable components for the circuitry depicted in FIG. 3 include: for $A_1$ and $A_2$, Analog Operational Amplifier No. 118K, available from Analog, Inc.; $I_2$ Motorola Inverter No. 7404; $I_3$, $I_4$, $I_5$, Motorola NOR gate No. 7402, Bit Counter, Motorola four bit counter No. 7493; decoder, Motorola 1/10 Decoder No. 1817; one shots, Signetics one shot No. 951. It will be understood that any of various commercially available components may be utilized and that the above circuitry and components are merely illustrative of the inventive system.

Typical suitable values for the FIG. 3 circuitry are: an $R_1$ of about 1,000 ohms, $V_3$ and $V_4$ of about 5 volts, $R_3$ and $R_4$ of about 2,000 ohms, a $V_2$ and $R_2$ adjustment which yields a voltage of about 2 volts in $R_2$, and an about 5 volt relay. It will be appreciated by those skilled in the art that all operational components are each suitably energized by an about 5 volt voltage source (not shown for all components) and that the circles by $A_1$, $A_2$, $I_2$, $I_3$, $I_4$, $I_5$ and the second one shot indicate inverted outputs.

Figure 4:
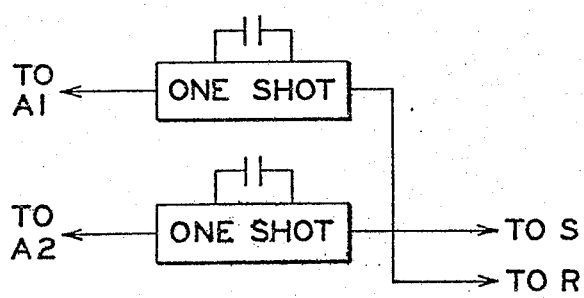
FIG. 4 is a schematic illustration of another imaging system embodiment of the present invention.

Thus, the FIG. 3 system is one in which imaging can be provided and in which the resistivity or conductance of the imaging layer 7 is periodically monitored and adjusted, automatically, based upon imaging cycles. A simplified circuit which automatically monitors during each imaging cycle and, if need be, adjusts the resistivity of layer 7 is obtained by substituting the FIG. 4 circuitry for the portion of FIG. 3 contained within the bracketed line. The one shots of FIGS. 3 and 4 are desired as signal delay elements to allow time for the operational imaging voltage to stabilize. Stabilization typically occurs about ½ second after operational imaging voltage application.

Figure 5:
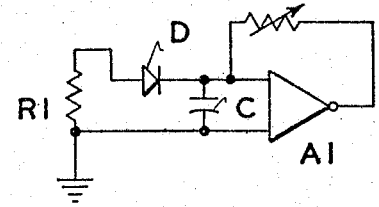
FIG. 5 schematically illustrates an A.C. embodiment of the imaging system of the present invention.

Further, as mentioned above, the operational imaging voltage can be either A.C. or D.C. The FIG. 3 circuitry is preferably used with D.C. imaging voltages but can be easily modified for A.C. imaging voltages by including a diode D and capacitor C as shown in FIG. 5. When image erase voltages are applied, the switch in parallel with $R_1$ in FIG. 3 is closed to prevent the erasure voltage from interfering with circuit operation.

It will be appreciated that other variations and modifications will occur to those skilled in the art upon a reading of the present disclosure. These are intended to be within the scope of this invention.

For example, any of numerous cell electrode configurations that allow selective addressing of the liquid crystalline material may be utilized, such as the so-called matrix or cross-grid electrode configuration, where uniform irradiation with ultraviolet radiation is desired and where a non-optical input is to be provided. Additionally, the layer of liquid crystalline composition can be provided in imagewise configuration.

Further, the advantageous system of the present invention can be employed to maintain the resistivity of mixtures of pure liquid crystalline materials and pure trans-stilbene nematics.

Alteration and maintenance of the trans-stilbene resistivity by U.V. radiation results in maintenance of a net resistivity for the resulting liquid crystalline compositions.

What is claimed is:
1. An electro-optic device, comprising:
   a. an electro-optic member comprising between two electrodes a layer of pure liquid crystalline composition comprising a pure trans-stilbene nematic liquid crystalline material;

b. an electrically energizable source of ultraviolet radiation positioned to impinge said layer with radiation upon energization;

c. in electrical connection with said member, comparison means for comparing the electrical resistivity of said layer with a predetermined resistivity value and for generating an electrical signal when the layer resistivity is greater than said predetermined resistivity value; and d. in electrical connection with said comparison means and said energizable source of ultraviolet radiation, energizing means for receiving said electrical signal and, upon receipt thereof, for energizing said source of ultraviolet radiation.

2. The electro-optic device according to claim 1 further including in electrical connection intermediate said comparison means and said energizable means, periodic gating means for allowing said energizing means to receive said electrical signal from said comparison means only at predetermined multiples of imaging cycles.

3. The electro-optic device of claim 2 further including in electrical connection with said periodic gating means and said energizing means, means for de-energizing said source of ultraviolet radiation at predetermined multiples of imaging cycles subsequent to energization of said source of ultraviolet radiation.

4. The electro-optic device of claim 2 wherein said periodic gating means comprises, in electrical connection, a bit counter, a bit decoder, signal generating means, signal delay means and a NOR gate.

5. The electro-optic device of claim 1 wherein said comparison means comprises an operational amplifier.

6. The electro-optic device of claim 5 wherein said energizing means comprises a flip-flop and relay.

7. The device according to claim 1 further including between one of said electrodes and said layer of liquid crystalline composition, a layer of photoconductive material.

8. The device according to claim 1 wherein said trans-stilbene is trans-4-butyl-$\alpha$-chloro-4'-ethoxy stilbene.

9. The device according to claim 7 wherein said trans-stilbene is trans-4-butyl-$\alpha$-chloro-4'-ethoxy stilbene and wherein said photoconductive material comprises arsenic triselenide.

10. The device according to claim 1 wherein said layer of liquid crystalline composition is in imagewise configuration.

11. The device according to claim 1 wherein at least one of said electrodes is provided in imagewise configuration.

* * * * *